United States Patent [19]
Hallstrom

[11] 3,881,448
[45] May 6, 1975

[54] MILKING VALVE

[76] Inventor: Olof A. Hallstrom, 1350 Hallstrom Rd., Tillamook, Oreg. 97141

[22] Filed: Nov. 23, 1973

[21] Appl. No.: 418,670

[52] U.S. Cl............................. 119/14.19; 119/14.2
[51] Int. Cl. .............................................. A01j 3/00
[58] Field of Search............ 119/14.19, 14.2, 14.21; 128/218 NV, 261

[56] References Cited
UNITED STATES PATENTS

| 1,116,379 | 11/1914 | Browning | 119/14.2 |
| 1,995,051 | 3/1935 | Benson | 119/14.21 |
| 3,557,778 | 1/1971 | Hughes | 128/218 NV |
| 3,563,264 | 2/1971 | Boegli | 119/75 |

Primary Examiner—Hugh R. Chamblee
Attorney, Agent, or Firm—Oliver D. Olson

[57] ABSTRACT

A hollow tube is extended into each teat of a cow's udder and retained substantially permanently therein, thereby maintaining open the teat passageway normally closed by the sphincter muscle. The end of the tube projecting from the teat is provided with an enlarged, hollow valve body containing a normally closed valve. A milk collecting tube is connected at one end to a hollow valve coupler adapted to be connected removably to the valve body, the coupler containing a valve operator which, upon interconnection of the valve body and coupler, automatically opens the normally closed valve, allowing milk in the udder to pass through the collecting tube to a collection receptacle.

10 Claims, 6 Drawing Figures

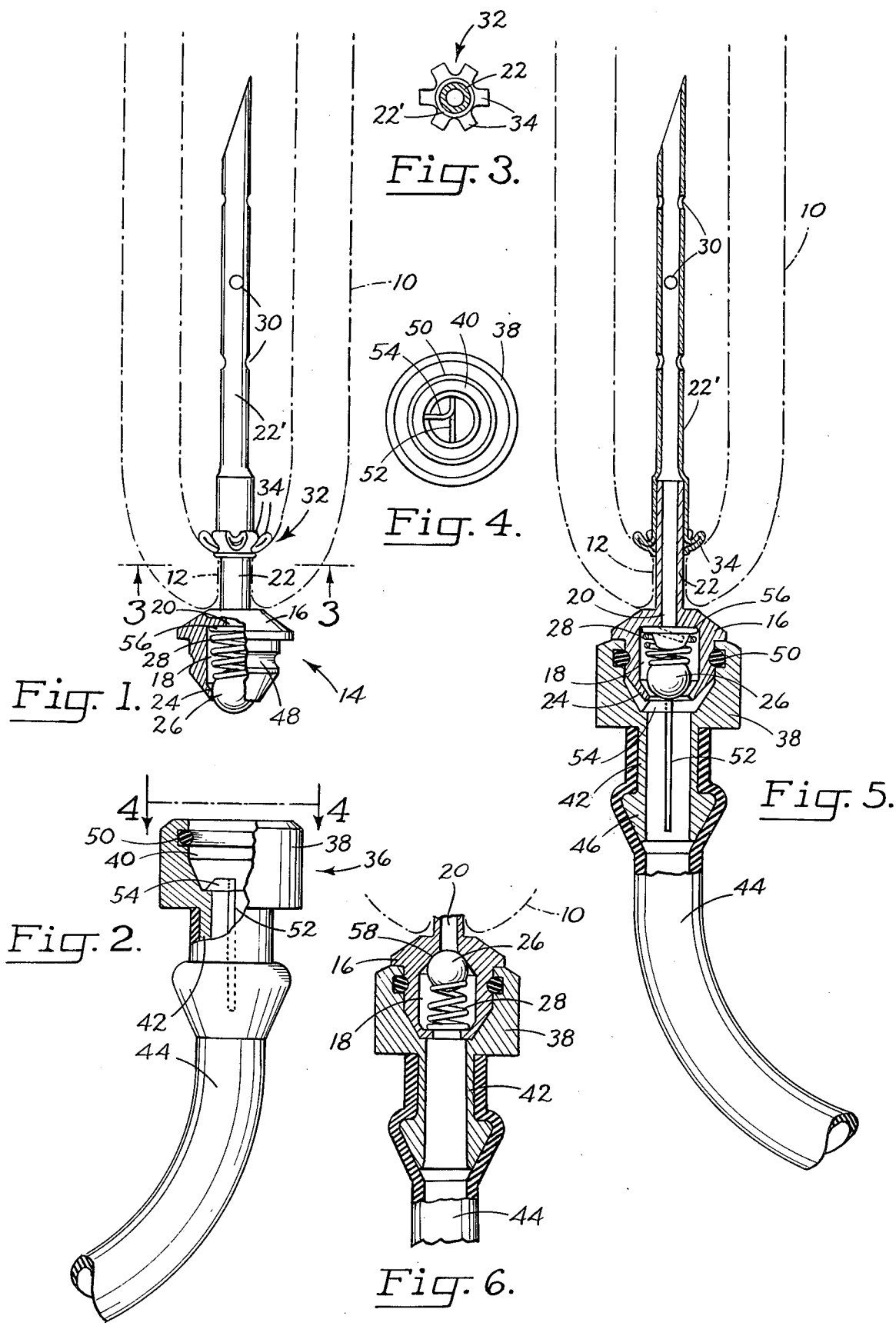

MILKING VALVE

BACKGROUND OF THE INVENTION

This invention relates to the milking of cows, and more particularly to a milking valve adapted for permanent installation in each teat of an udder to facilitate milking of a cow.

Hand milking involves manipulation of the teat to force milk through the end opening which normally is closed by the sphincter muscle defining the opening.

Early forms of conventional mechanical milking equipment utilizes a partially evacuated milk collection receptacle connected by rigid teat cups to the udder teats, to provide a pressure differential by which milk is forced past the sphincter muscle to the receptacle. This also forces blood to the end of the teat, causing adverse swelling which shuts off the flow of milk.

Presently employed mechanical milking equipment still utilizes the partially evacuated collection receptacle, and additionally employs a pulsating vacuum between a rigid teat cup and a flexible liner therein to effect intermittent ballooning and collapsing of the teat. Although this complex, cumbersome and costly equipment provides a massaging effect which reduces swelling, it also contributes detrimentally to the development of mastitis, unless the equipment is in perfect working order, is under the control of skilled personnel and is maintained in a high degree of cleanliness.

Further, these prior forms of mechanical milking equipment are incapable of milking cows with tight sphincter muscles and those having abnormal scar tissue or other growth within the teats. Because of this equipment limitation, such otherwise productive cows are disposed of as unprofitable.

Still further, the relatively slow process of intermittent extraction of milk by hand milking or by presently employed mechanical equipment, contributes adversely to excessive cost of milk production.

SUMMARY OF THE INVENTION

In its basic concept, the milking valve of this invention functions by substantially permanent installation in an udder teat to maintain the sphincter muscle opening open, and provides a normally closed valve at the outer end of the teat which is opened automatically upon connection of a valve operator communicating with a milk collection tube.

It is by virtue of the foregoing basic concept that the principal objective of this invention is achieved; namely, to overcome the aforementioned limitations and disadvantages of prior milking techniques and equipment.

Another important object of this invention is the provision of a milking valve which provides continuous extraction of milk, with complete emptying of the udder, whereby to achieve maximum rate of milk production.

Still another important object of this invention is the provision of a milking valve which is permanently installed in an udder teat, without irritation or other adverse effects, whereby to retain for maximum productive life those cows which, because of tight sphincter muscles or other teat injuries, would otherwise be disposed of as unprofitable.

A further important object of this invention is the provision of a milking valve which contributes significantly to minimizing cost of milk transport systems between the cow and the milk storage receptacle.

A still further important object of this invention is the provision of a milking valve of simplified and therefore economical manufacture.

The foregoing and other objects and advantages of this invention will appear from the following detailed description, taken in connection with the accompanying drawing of a preferred embodiment.

BRIEF DESCRIPTION OF THE DRAWING

FIG. 1 is a view in vertical elevation showing installed in an udder teat, indicated by broken lines, a valve component of a milking valve embodying the features of this invention, a portion being broken away to disclose details of internal construction.

FIG. 2 is a fragmentary view in vertical elevation of a cooperating coupler component for the valve component shown in FIG. 1.

FIG. 3 is a transverse sectional view taken on the line 3—3 in FIG. 1.

FIG. 4 is a plan view as viewed in the direction of the arrows 4—4 in FIG. 2.

FIG. 5 is a fragmentary, longitudinal section showing the valve and coupler components of FIGS. 1 and 2 interconnected to effect the milking operation.

FIG. 6 is a fragmentary, longitudinal section similar to FIG. 5 showing a modified form of milking valve embodying the features of this invention.

DESCRIPTION OF THE PREFERRED EMBODIMENT

FIGS. 1 and 5 of the drawing show in broken lines the lower portion of an udder teat 10, wherein the lower opening 12 is defined and normally maintained closed by an annular sphincter muscle.

It is a fundamental purpose of this invention to provide a milking valve which maintains this muscle opening at all times, while still preventing the escape of milk except during the milking operation. Accordingly, the milking valve includes a valve component 14 (FIG. 1) adapted for permanent installation in the teat. In the embodiment illustrated, the valve component comprises a valve body 16 having a longitudinal passageway 18 therethrough communicating at its inner end with the passageway 20 of a hollow inlet tube 22 extending from the inner end of the valve body.

The passageway 18 in the valve body normally is closed by a valve. In the embodiment illustrated, the outer end of this passageway is reduced in cross section, forming a seat 24 for a ball valve 26. The ball is urged resiliently against the seat, to normal valve-closing position, by means of a coil spring 28 interposed between the ball and a shoulder formed between the inner end of the passageway 18 and the communicating end of the passageway 20 in the inlet tube 22.

Although the inlet tube may be formed of one piece, the preferred construction illustrated provides the tube in two sections. The tube section 22, which extends through the muscle opening, is joined at its outer end to the valve body 16, and preferably is made integral therewith, as by well known techniques of injection molding of synthetic resin. This outer tube section is of sufficient strength to resist collapsing under the constrictive force of the sphincter muscle.

The inner tube section 22' preferably is made of very flexible plastic material, many types of which are well known and commerically available. This inner section is joined to the inner end of the outer sections, as by slipping the outer end of the inner section over the inner end of the outer section. The connection may be secured either by frictional interengagement, or by any one of many well known bonding techniques, such as heat sealing, solvent welding, adhesive bonding, etc.

A multiplicity of openings 30 are provided through the side wall of the inner tubing section, thereby providing a multiplicity of inlets for milk.

In the preferred use of the milking valve of this invention, the valve component 14 is installed permanently in the teat. For this purpose, retainer means is provided on the inlet tube for engagement with the inner surface of the teat, adjacent the sphincter muscle, to prevent accidental or inadvertent removal of the valve component. In general, the retainer means is provided by an enlarged shoulder 32 projecting outward from the tube a distance spaced inwardly from the valve body 16 sufficient to interpose therebetween the sphincter muscle of the teat.

In the preferred embodiment illustrated, the retainer shoulder is formed by enlarging the diameter of the lapping end portion of the inner tube section, then collapsing the enlarged portion longitudinally to form an annular shoulder, and then slitting the annular shoulder radially at circumferentially spaced positions. The annular shoulder thus takes the form of a multiplicity of radiating tabs 34 of resiliently flexible soft plastic material. By this construction the inlet tube may be inserted through the sphincter muscle opening, during which the shoulder tabs flex inwardly adjacent the wall of the outer tube 22, until the shoulder passes the muscle. The resilient tabs thereupon flex outward to the position illustrated in FIGS. 1 and 5, where they abut the inner surface of the teat adjacent the muscle, thereby insuring retention of the valve component on the teat.

The valve component thus is retained permanently on each teat, the normally closed ball valve 26 prevents the escape of milk. Since the valve body is of minimum size, typically about ⅝ inch in length and width, it presents no discomfort or annoyance to the cow and is not susceptible of damage.

The valve component functions by cooperative association with a coupling component 36 (FIG. 2) to effectuate milking of the cow. In the embodiment illustrated, the coupling component includes a coupler body 38 having a longitudinal passageway 40 therethrough. The coupler body includes an integral tubular extension 42 for connection of one end of a flexible delivery tube 44 the opposite end of which communicates with a milk collection receptacle (not shown). As illustrated, the extension preferably includes an enlarged shoulder 46 (FIG. 5) to insure against inadvertent disconnection of the delivery tube.

The enlarged, outer portion of the passageway 40 at the end of the body 38 opposite the extension 42 is dimensioned to receive therein the outer portion of the valve body 16, and hence forms a socket therefor. Connector means is provided on the valve body and coupler body for securing them together detachably. In the embodiment illustrated, this connector means comprises a peripheral groove 48 in the valve body and a resilient O-ring 50 on the coupler body 38. The O-ring functions as a resilient clip which snaps into the annular groove upon interconnection of the valve and coupler bodies. The O-ring functions additionally as a liquid tight seal between the valve and coupler bodies.

Means is provided in the coupler body to effect opening of the valve in the valve body automatically upon interconnection of the valve and coupler bodies. In the embodiment illustrated, this valve actuator comprises an elongated flat pin 52 which is located centrally within the passageway of the extension 42 and coupler body 38 and is secured therein by any suitable means. As illustrated, the width of the flat pin is slightly greater than the diameter of the passageway, whereby the pin is retained in position by a press fit within the passageway.

The pin 52 extends into the socket of the coupler body 38 a distance predetermined to effect opening of the ball valve 26 upon interconnection of the valve and coupler bodies. This position of extension conveniently is maintained by an offset tab 54 struck laterally (FIG. 4) from the end of the flat pin for abutment against the inner surface of the socket.

The milking valve described herein before functions as follows: A valve component 14 is installed in each of the udder teats 10 of a cow, preferably for permanent retention, as previously described. The teat opening 12 defined by the sphincter muscle is kept open at all times by virtue of the tubular extension 22 of the valve body, and the normally closed valve 26 prevents the escape of milk.

When it is desired to milk the cow, the exposed surfaces of each of the valve bodies 16 is cleaned and the associated coupler body 38 is attached thereto, by means of the resilient O-ring clip 50 and cooperating groove 48.

This interconnection of the valve and coupler bodies is accompanied simultaneously by automatic opening of the ball valve 26, by its abutment with the valve actuator pin 52. Accordingly, milk drains continuously from the udder through the flexible tubes 44 to the collection receptacle. This may be continued until the udder is completely emtied.

If desired, the collection receptacle may be partially evacuated to provide a pressure differential between the udder and receptacle, to maximize the rate of withdrawal of milk from the udder.

Upon completion of the milking operation, the coupler bodies 38 are disconnected from the associated valve bodies 16, whereupon the ball valve 26 in each valve body is returned resiliently to the closed position illustrated in FIG. 1.

If desired, a flapper or similar valve 56 may be interposed between the inner end of spring 28 and passageway 20 to prevent backflow upward into the passageway. The valve 56 is chosen, of course, to open when milk is being withdrawn from the udder. Thus, the valve may open merely by the weight of milk above it, or it may open in response to a partial vacuum in the collection receptacle.

FIG. 6 illustrates an embodiment of this invention which is suitable for use with collection receptacles provided with a partial vacuum. In this embodiment the positions of the ball valve 26 and spring 28 are interchanged. Thus, the spring urges the ball valve resiliently inward toward a seat 58 formed at the outer end of the passageway 20. Upon connection of the coupler body 38 to the valve body 16, the partial vacuum in the collection receptacle forces the ball valve 26 away from its seat 58, against the opposing force of spring 28. Accordingly, the valve opening pin 52 of the embodiment illustrated in FIGS. 1–5 is omitted in the embodiment of FIG. 6.

In both of the illustrated embodiments, valve-actuating means is associated with the coupler body 38 whereby connection of the coupler body to the valve body 16 effects automatic opening of the ball valve 26. This is accomplished in the embodiment of FIGS. 1–5 by the pin 52 and in the embodiment of FIG. 6 by the partial vacuum from the collection receptacle.

From the foregoing, it will be appreciated that the present invention provides a milking valve of extremely simplified construction, which includes a valve component capable of permanent installation in each udder teat, which also includes a coupler component which replaces the complex and costly transport mechanism of conventional mechanical milking equipment of the present usage, and which milking valve also effects continuous and complete drainage of milk from the udder in a minimum of time and without irritation or other adverse effects to the animal.

It will be apparent to those skilled in the art that various changes may be made in the size, shape, type, number and arrangement of parts described hereinbefore, without departing from the spirit of this invention.

Having now described my invention and the manner in which it may be used, I claim:

1. A milking valve comprising
   a. a valve component including
      1. a valve body having a longitudinal passageway therethrough,
      2. a valve member in the valve body normally closing said passageway, and
      3. a hollow inlet tube extending from the valve body and adapted for insertion through the opening defined by the sphincter muscle of an udder teat, and
   b. a coupler component including
      1. a hollow valve coupler body arranged for removable connection to the valve body and adapted for communication with a milk collection receptacle, and
      2. valve actuating means associated with the coupler body for moving the valve member to open the passageway upon connection of the coupler body to the valve body.

2. The milking valve of claim 1 including retainer means on the inlet tube inwardly of the valve body arranged to engage the inner surface of an udder teat inwardly of the sphincter muscle thereof for retaining the tube in said teat.

3. The milking valve of claim 2 wherein the retainer means comprises an enlarged shoulder on the tube.

4. The milking valve of claim 3 wherein the shoulder comprises a plurality of peripheral resilient tabs arranged to flex inwardly during inward passage through the sphincter muscle opening and thereafter to flex outwardly to retaining position.

5. The milking valve of claim 1 wherein the valve member comprises a ball, and spring means in the passageway engages the ball and urges the latter resiliently to passageway closing position.

6. The milking valve of claim 1 wherein the valve member comprises a ball at the outer end of the valve body passageway, spring means in the passageway engages the ball and urges the latter outward toward closing position, and the valve actuating means comprises a pin member in the coupler body arranged upon connection of the latter to the valve body to engage the ball and move it to open position.

7. The milking valve of claim 1 wherein the valve member comprises a ball at the inner end of the valve body passageway, spring means in the passageway engages the ball and urges the latter inward toward closing position, and the valve actuating means comprises means providing a partial vacuum to the hollow coupler body whereupon connection of the latter to the valve body effects movement of the ball to open position.

8. The milking valve of claim 1 including connector means on the valve body and coupler body arranged for releasable interconnection for detachably connecting the valve body and coupler body together.

9. The milking valve of claim 8 wherein the connector means comprises a peripheral groove in the valve body and resilient clip means on the coupler body arranged to engage said groove.

10. The milking valve of claim 9 wherein the clip means comprises a resilient O-ring seal.

* * * * *